(12) United States Patent
Hickman

(10) Patent No.: US 8,678,626 B1
(45) Date of Patent: Mar. 25, 2014

(54) LIGHTED BED RAILS

(76) Inventor: Bryan S Hickman, Montgomery, TX (US)

( * ) Notice: Subject to any disclaimer, the term of this patent is extended or adjusted under 35 U.S.C. 154(b) by 106 days.

(21) Appl. No.: 13/556,652

(22) Filed: Jul. 24, 2012

Related U.S. Application Data

(60) Provisional application No. 61/513,718, filed on Aug. 1, 2011.

(51) Int. Cl.
*B60Q 3/00* (2006.01)
*B60Q 3/06* (2006.01)

(52) U.S. Cl.
CPC ........................................ *B60Q 3/06* (2013.01)
USPC .............................. 362/485; 382/487; 382/544

(58) Field of Classification Search
CPC ........................................................ B60Q 3/06
USPC ............ 362/485, 487, 544; 296/3, 36, 32, 40; 248/499, 503
See application file for complete search history.

(56) References Cited

U.S. PATENT DOCUMENTS

| | | | |
|---|---|---|---|
| 5,495,400 A * | 2/1996 | Currie | 362/551 |
| 5,573,327 A | 11/1996 | Dealey, Jr. | |
| 5,678,914 A | 10/1997 | Dealey | |
| 6,763,778 B2 * | 7/2004 | Bergquist et al. | 116/28 R |
| 6,883,931 B2 | 4/2005 | Tufte | |
| 7,390,044 B2 | 6/2008 | Marquez | |
| 8,286,996 B2 * | 10/2012 | Grant | 280/748 |
| 2005/0152145 A1 * | 7/2005 | Currie et al. | 362/294 |
| 2007/0008732 A1 | 1/2007 | Robertson | |

\* cited by examiner

*Primary Examiner* — Ali Alavi
(74) *Attorney, Agent, or Firm* — Dinsmore & Shohl LLP; Monika J. Hussell

(57) ABSTRACT

A lighted bed rail may be used with a vehicle. The lighted bed rail may comprise a central tube member, a first end member, a second end member, and at least one lighting apparatus. The central tube member may comprise a first end, a second end, and a tube wall, the tube wall comprising an inner surface and an outer surface. At least one lighting apparatus may be disposed on or within the first end member, second end member, or central tube member. The lighting apparatus may be capable of projecting light onto at least a portion of the inner surface of the tube wall of the central tube member. The tube wall of the central tube member may be sufficiently transparent or translucent to allow for the transmission of light projected from the lighting apparatus through at least a portion of the tube wall of the central tube member.

21 Claims, 7 Drawing Sheets

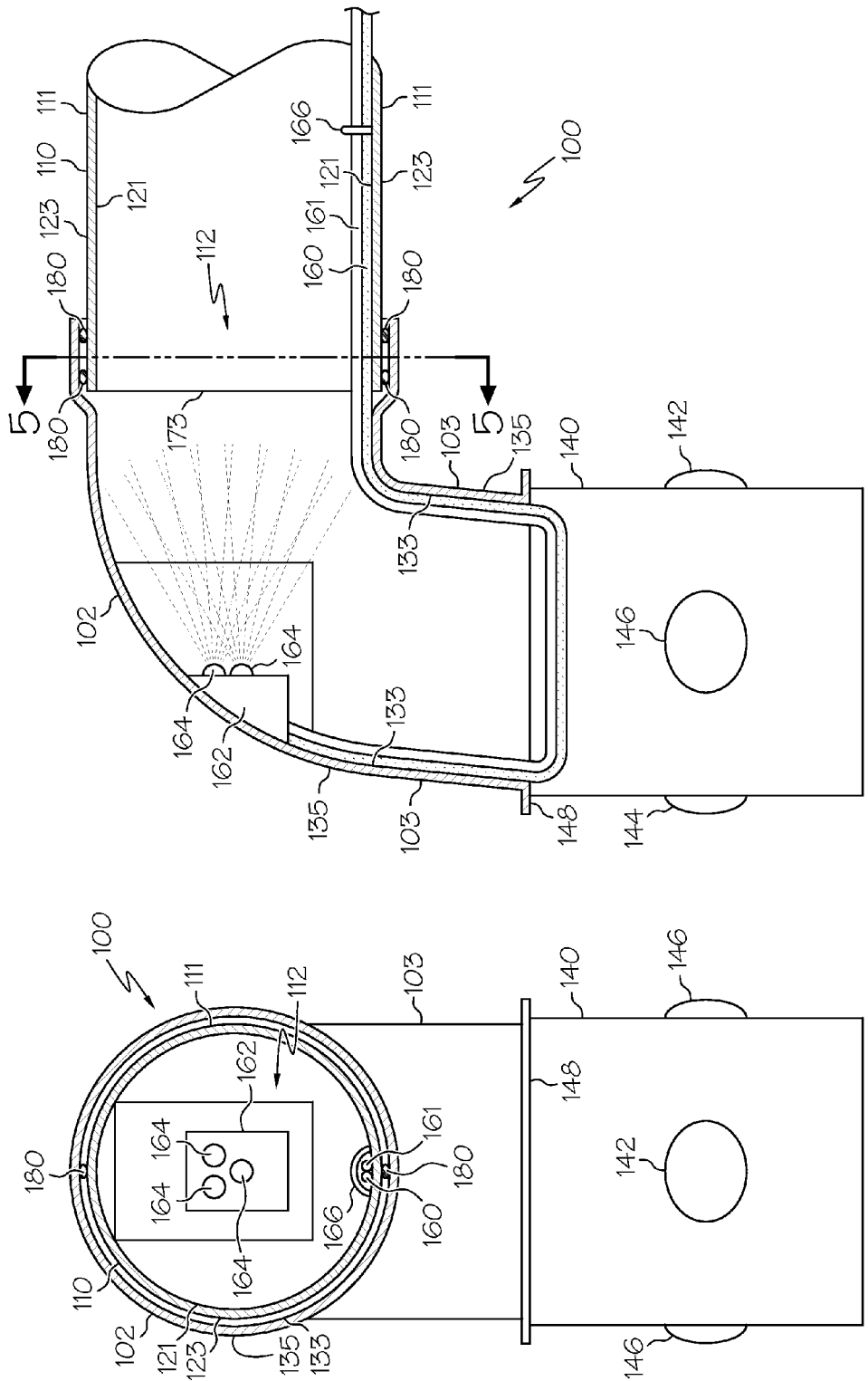

LIGHTED BED RAILS

BACKGROUND

1. Field

The present disclosure relates generally to automotive accessories and, more specifically, to bed rails with internal lighting sources that can be installed onto pick-up trucks or other vehicles.

2. Technical Background

If not already outfitted as desired, many automobile owners elect to add various accessories to their vehicle that enhance the vehicle's function, performance, and/or enhance the vehicle's appearance.

A common truck accessory is a so-called "truck bed rail", an accessory that is often formed of tubular steel, or the like, and affixed to the upper surfaces on either side of the truck's bed. Generally speaking, many bed rails are formed from a single, solid walled tube that is bolted to the truck bed with a suitable flange. The general goal is structural integrity since fairly heavy loads may be applied to the bed rails. However, the design and materials of construction of traditional truck bed rails does not allow for a bed rail that can be visually enhanced by an internal light.

There remains a need, therefore, for a truck bed rail that includes an internal light source that transmits light through a translucent truck rail where the truck rail glows for an enhanced appearance and may be used as a vehicle's signaling system.

BRIEF SUMMARY

The concepts of the present disclosure are generally applicable to bed rails for trucks or other vehicles. In accordance with one embodiment of the present disclosure, a lighted bed rail may be used with a vehicle. The lighted bed rail may comprise a central tube member, a first end member, a second end member, and at least one lighting apparatus. The central tube member may comprise a first end, a second end, and a tube wall, the tube wall comprising an inner surface and an outer surface. The first end member may be attached to the central tube member at or near the first end of the central tube member and may comprise means for affixing the first end member to the vehicle. The second end member may be attached to the central tube member at or near the second end of the central tube member and may comprise means for affixing the first end member to the vehicle. At least one lighting apparatus may be disposed on or within the first end member, second end member, or central tube member. The lighting apparatus may be capable of projecting light onto at least a portion of the inner surface of the tube wall of the central tube member. The tube wall of the central tube member may be sufficiently transparent or translucent to allow for the transmission of light projected from the lighting apparatus through at least a portion of the tube wall of the central tube member.

In accordance with another embodiment of the present disclosure, a lighted bed rail may be used with a vehicle. The lighted bed rail may comprise a central tube member, a first end member, a second end member, and at least one lighting apparatus. The central tube member may comprise a first end, a second end, and a tube wall, the tube wall comprising an inner surface and an outer surface. The first end member may be attached to the central tube member at or near the first end of the central tube member and may comprise means for affixing the first end member to the vehicle. The second end member may be attached to the central tube member at or near the second end of the central tube member and may comprise means for affixing the first end member to the vehicle. At least one lighting apparatus may be disposed on or within the first end member, second end member, or central tube member. The lighting apparatus may be capable of projecting light onto at least a portion of the inner surface of the tube wall of the central tube member. The tube wall of the central tube member may be sufficiently transparent or translucent to allow for the transmission of light projected from the lighting apparatus through at least a portion of the tube wall of the central tube member. At least a portion of the central tube member may be translucent and at least a portion of the first end member and at least a portion of the second end member may be opaque.

In accordance with another embodiment of the present disclosure, a vehicle may comprising a bed, two bed side walls, and a lighted bed rail attached to the top of each of the bed side walls. The lighted bed rail may comprise a central tube member, a first end member, a second end member, and at least one lighting apparatus. The central tube member may comprise a first end, a second end, and a tube wall, the tube wall comprising an inner surface and an outer surface. The first end member may be attached to the central tube member at or near the first end of the central tube member and may comprise means for affixing the first end member to the vehicle. The second end member may be attached to the central tube member at or near the second end of the central tube member and may comprise means for affixing the first end member to the vehicle. At least one lighting apparatus may be disposed on or within the first end member, second end member, or central tube member. The lighting apparatus may be capable of projecting light onto at least a portion of the inner surface of the tube wall of the central tube member. The tube wall of the central tube member may be sufficiently transparent or translucent to allow for the transmission of light projected from the lighting apparatus through at least a portion of the tube wall of the central tube member.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 5 is a schematic cut-away width view of an attachment point of an end member and the central tube member of the lighted bed rail of FIGS. 1-4, according to one or more embodiments of the present disclosure;

FIG. 6 is a schematic cut-away length view of an attachment point of an end member and central tube member of the lighted bed rail of FIGS. 1-4, according to one or more embodiments of the present disclosure;

DETAILED DESCRIPTION

Figure 1:
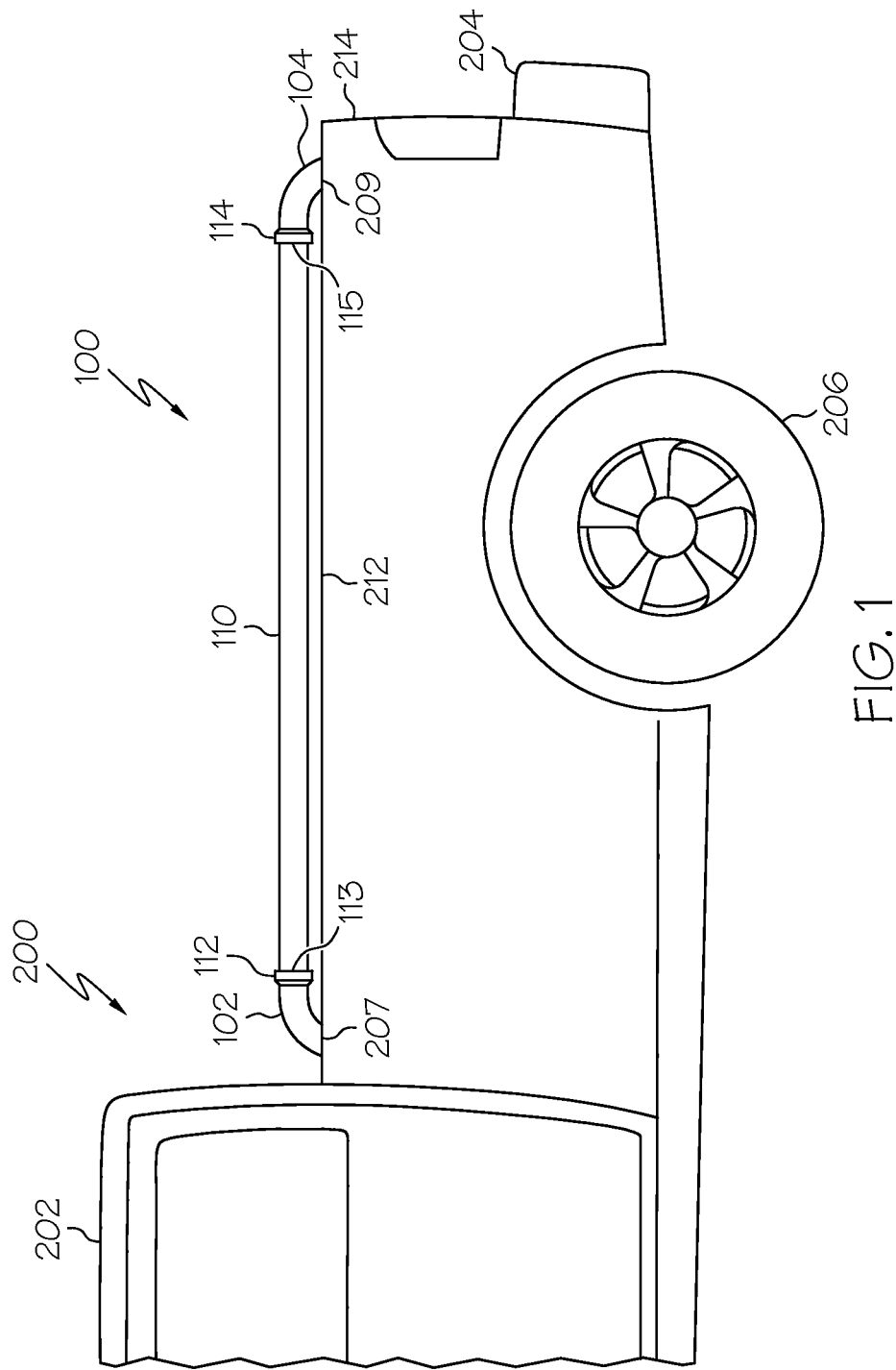
FIG. 1 is a schematic side view of a vehicle with a lighted bed rail installed thereon, according to one or more embodiments of the present disclosure.

Lighted bed rails may be disposed onto the sides of a truck bed, identical or similar to the positioning of traditional, opaque truck bed rails. The lighted bed rail may generally comprise a central tube member, a first end member, a second end member, and at least one lighting apparatus disposed on or within the first central tube member, first end member, or second end member. The central tube member may be transparent or translucent, and the at least one lighting apparatus may shine light onto at least a portion of the transparent or translucent central tube member, such as to allow for the transmission of light through at least a portion of the wall of the central tube member.

Now referring generally to FIGS. 1-4, a vehicle 200 is depicted. Although a standard design pick-up truck is depicted in FIG. 1-4, it is noted that the lighted bed rails 100 may be installed onto any vehicle including, without limitation, wheeled vehicles, vehicles with airfoils, tracked vehicles, vessels for transport on water or the like, such as, for example, a car, a truck, a motorcycle, a airplane, a helicopter, a tank, or a ship.

In one embodiment, the vehicle 200 is a pick-up truck and may comprise a passenger compartment 202 in its front, a rear bumper 204 at its rear, and one or more wheels 206. The vehicle 200 may comprise a bed 210 that is formed from bed side walls 212 and a bed back wall 214. In one embodiment, one or more lighted bed rails 100 may be positioned onto one or both of the bed side walls 212 of the vehicle 200. The lighted bed rail 100 may generally comprise a central tube member 110, and two end members 102,104. The first end member 102 and second end member 104 may each be attached to opposite ends of the central tube member 110, at two attachment points 113,115 respectively. For example, in one embodiment, each end of the central tube member 110 may be attached by insertion into an end member opening 112,114. The first end member 102 may be attached to the top of the bed side wall 212 of the vehicle 200 at an attachment point 207 and the second end member 104 may be attached to the top of the bed side wall 212 of the vehicle 200 at an attachment point 209.

As described herein, the lighted bed rails 100 may be employed in pairs, such that each bed side wall 212 of the vehicle 200 has a lighted bed rail 100 attached thereto. As such, it should be understood that when a lighted bed rail 100 is described herein, that description may be associated with either one lighted bed rail 100 or each lighted bed rail 100 of a symmetric pair installed onto each bed side wall 212 of a vehicle 200.

Referring to FIG. 1, in one embodiment, the central tube member 110 may be a single tube. In such an embodiment, a single tube is selected that is of a desired length, such that it can attach to the first end member 102 and second end member 104, and allow the first end member 102 and second end member 104 to connect to the truck at desired attachment points 207,209 respectively. For example, a first end of the central tube member 110 may connect to the first end member 102 at an attachment point 113 formed by a first end member opening 112 and a second end of the central tube member 110 may connect to the second end member 104 at an attachment point 115 formed by a second end member opening 114.

Figure 2:
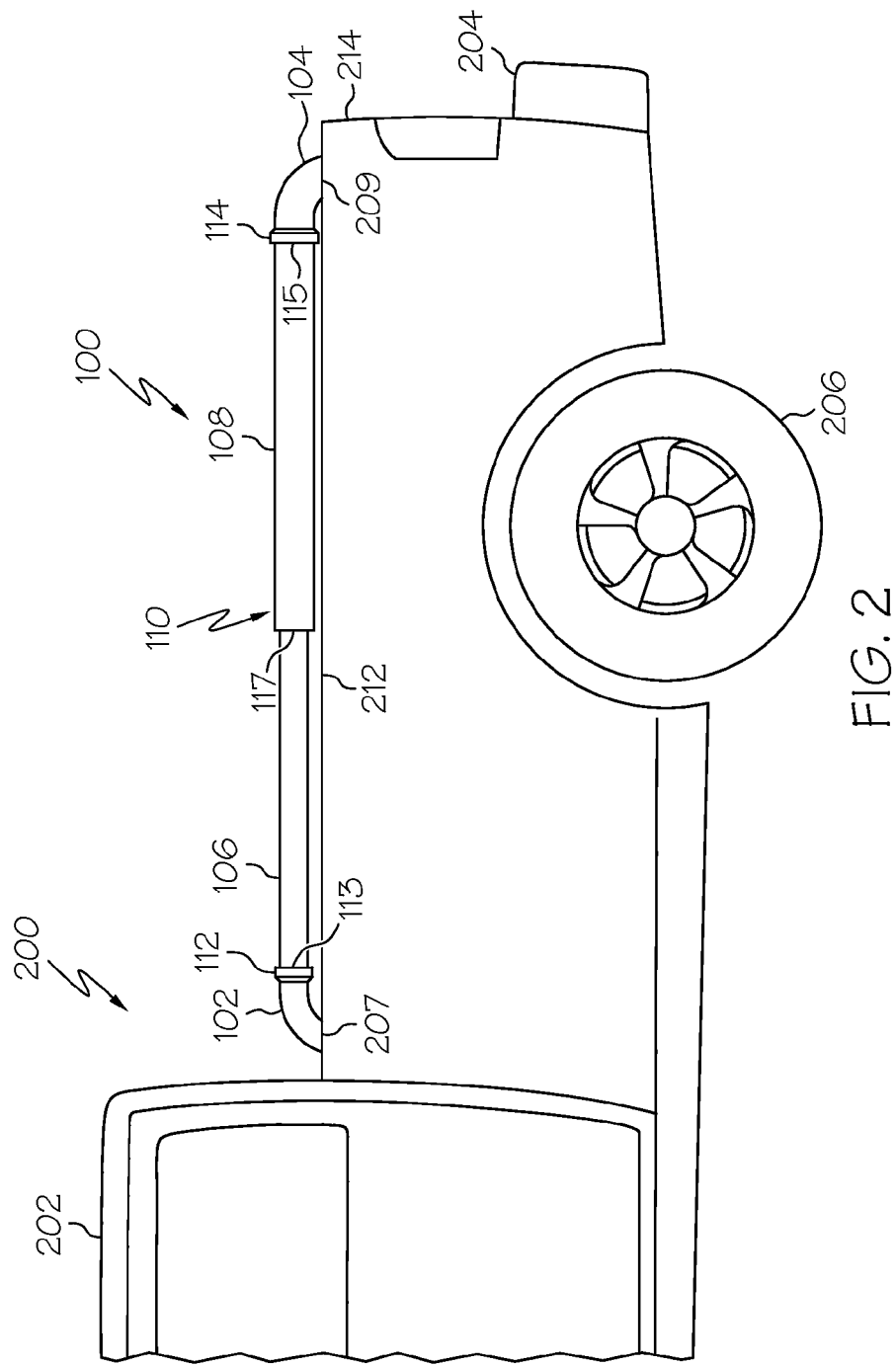
FIG. 2 is a schematic side view of a vehicle with a lighted bed rail comprising a two-part adjustable central tube member installed thereon, according to one or more embodiments of the present disclosure.
Figure 3:
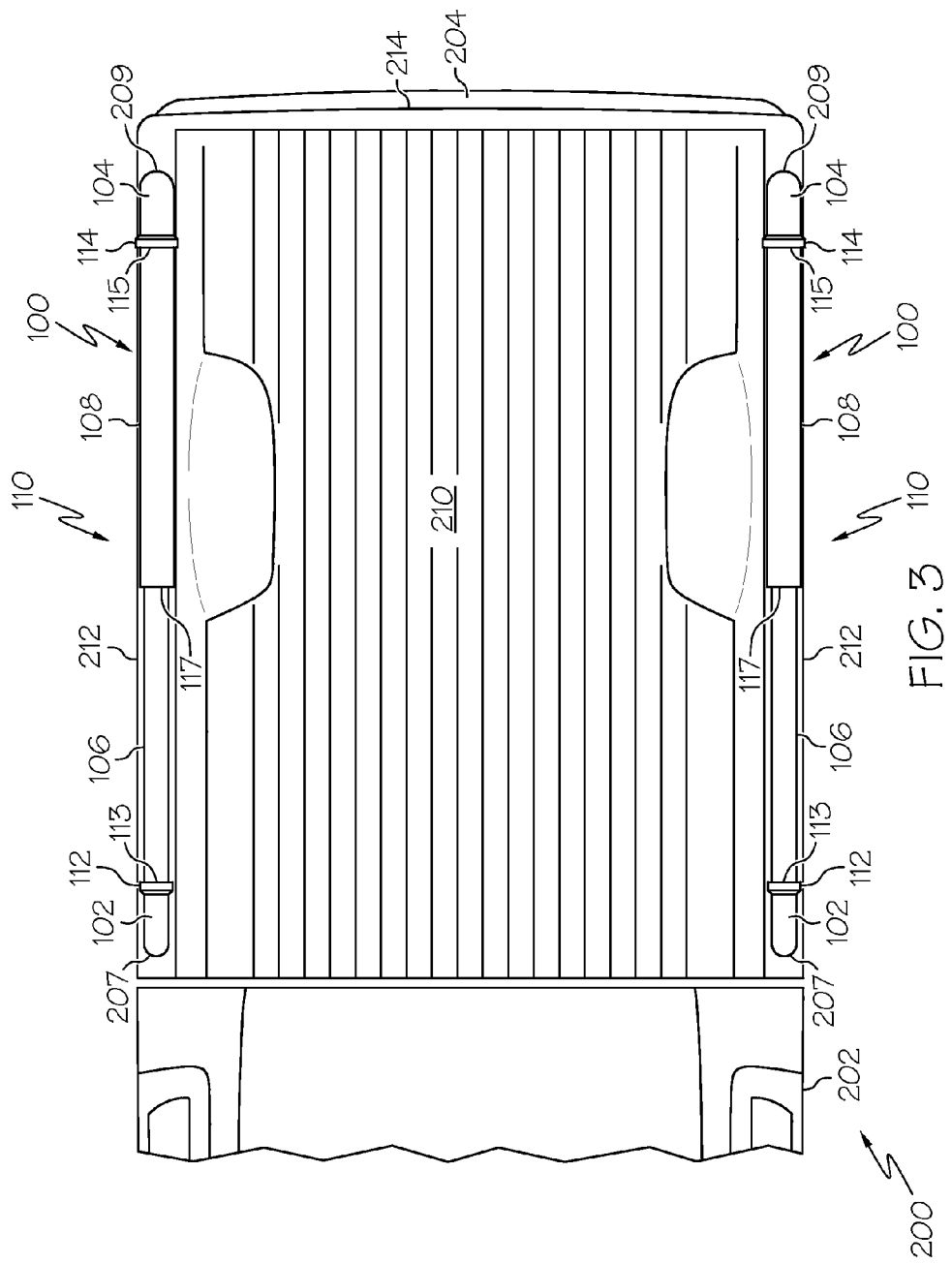
FIG. 3 is a schematic top view of the vehicle of FIG. 2, according to one or more embodiments of the present disclosure.

Now referring to FIGS. 2-3, in another embodiment, the central tube member 110 may comprise two or more central tube components 106,108, such as two or more tube components 106,108 that may be attached at an attachment point 117. For example, a first central tube component 106 may be attached to a first end member 102 at an attachment point 113 formed by a first end member opening 112 and a second central tube component 108 may be attached to a second end member 104 at an attachment point 115 formed by a second end member opening 114. The first central tube component 106 and second central tube component 108 may be attached at an attachment point 117 such as by overlap of the first central tube component 106 and the second central tube component 108, such that, for example, the first central tube component 106 may slide into the second central tube component 108 to form a central tube member 110 that is length adjustable, allowing for a central tube member 110 that can be fitted for a variety of models and sizes of pick-up trucks.

Figure 4:
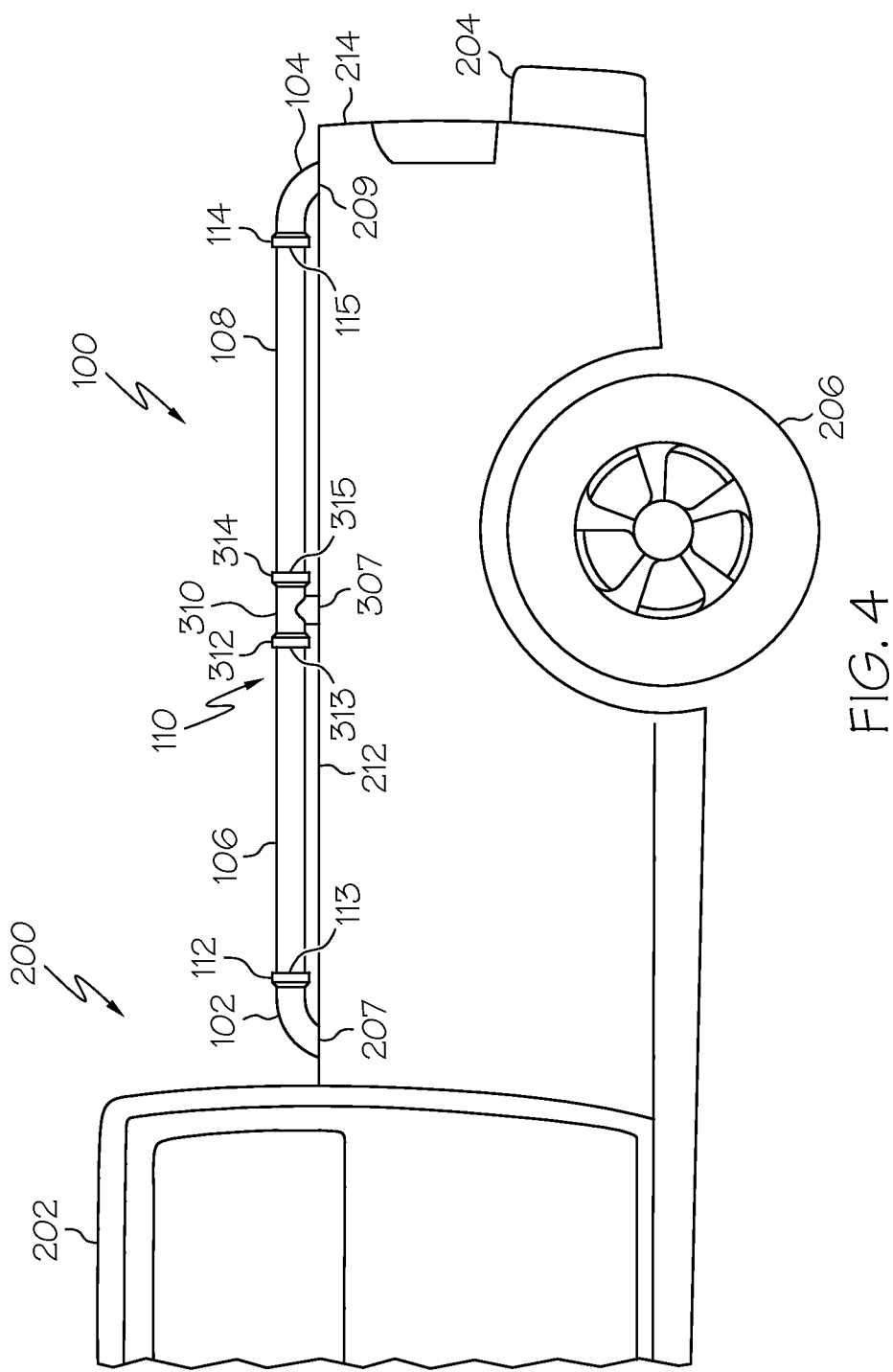
FIG. 4 is a schematic side view of a vehicle with a lighted bed rail comprising a two-part central tube member and a T-connector installed thereon, according to one or more embodiments of the present disclosure.

Now referring to FIG. 4, in another embodiment, the central tube member 110 may comprise multiple central tube components 106,108 that are indirectly attached through some other connection means, such as a T-connector 310. For example, a first central tube component 106 may be attached to a first end member 102 at an attachment point 113 formed by a first end member opening 112 and a second central tube component 108 may be attached to a second end member 104 at an attachment point 115 formed by a second end member opening 114. The first central tube component 106 may be further attached to a T-connector 310 at an attachment point 313 formed by a T-connector first opening 312 and the second central tube component 108 may be further attached to a T-connector 310 at an attachment point 315 formed by a T-connector second opening 314. The T-connector 310 may attach to the bed side wall 212 of the vehicle 200 at an attachment point 307. The T-connector attachment point 307 may generally be positioned between the attachment points 207,209 of the first end member 102 and the second end member 104 on the bed side wall 212. Generally, the T-connector 310 may mechanically support the central tube member 110 by limiting the flex or bow of the central tube member 110 that may result from a tube material that is not completely rigid. The T-connector 310 may also be a location for the placement of a lighting apparatus.

Referring now to FIGS. 5 and 6, the connection of an end member 102 and the central tube member 110 is depicted. It should be understood that while FIGS. 5 and 6 depict the first end member 102 connected to a central tube member 110 at an attachment point 113, FIGS. 5 and 6 may also represent the construction of the second end member 104 connected to the opposite end of the central tube member 110. For example, the central tube member 110 and first end member 102 at attachment point 113, and the second end member 104 and central tube member 110 at attachments point 115 may have similar construction. It should also be understood that the central tube member 110 depicted in FIGS. 5 and 6 may represent a single tubing piece, such as depicted in FIG. 1, or may represent a central tube component, such as the first central tube component 106 or second central tube component 108 of FIGS. 2 and 3, or the first central tube component 106 or second central tube component 108 of the T-connector embodiment of FIG. 4.

The end member 102 generally comprises an end member opening 112 that may accept the central tube member 110 at its end 173 and an end member base 140. The end member opening 112 may be shaped such as to allow for the central tube member 110 to be connected to the end member 102 wherein the end member 102 may attach to a vehicle 200 at the end member base 140 and have the central tube member 110 positioned relatively horizontally and parallel to the top of the truck bed side wall and the driving surface. In one embodiment, the end member 102 may generally be a curved tube shape, such as an elbow, comprising an end member tube wall 103 comprising an end member tube wall inner surface 133 and an end member tube wall outer surface 135.

The end member 102 may be constructed from a plastic material, such as, but not limited to, polyvinyl chloride, acrylic, polycarbonate, polyethylene, from a ceramic material, or from metallic or semi-metallic material, such as, but not limited to, iron and alloys thereof, such as steel, or combinations thereof. The end member 102 may be opaque or alternatively may be transparent or translucent, and may be constructed from a colored material, such as to project a colored light when a light ray passes through the tube wall 103. As used herein, a translucent material may permit light to pass through but diffuses the light so that persons, objects, etc., on the opposite side of the material are not clearly visible, and a transparent material has the property of transmitting rays of light through its substance so that bodies situated beyond or behind the material can be distinctly seen.

In one embodiment, the end member 102 may comprise a base 140 that is inside the bed side wall and non-visible when the lighted bed rail 100 is installed onto a vehicle 200. The end member base 140 may comprise an end member base rim 148 which is situated directly on top of the bed side wall when the lighted bed rail 100 is installed. The end member base 140 may comprise at least one extendable arm member 142,144, 146 that can extend outward from the end member base 140 to allow for the end member 102 to lock into an aperture or recess in the truck bed side wall. In one embodiment, the end member base 140 may comprise at least an inner extendable arm member 142, outer extendable arm member 14, and side extendable arm member 146 that are positioned around the end member base 140 to adequately lock in the end member 102 to the truck bed side wall. The at least one extendable arm members 142,144,146 may be spring loaded, such that they can be compressed into the end member base 140 when the lighted bed rail 100 is being installed and automatically deploy outward once inserted into the truck bed side wall to lock the lighted bed rail 100 into place. Generally, the end member base 140 may be tubular shaped, or may be of any other shape.

The end member 102 may have a circular cross sectional shape, but is not limited to such a cross sectional shape, as the end member may generally comprise a bended tube shape wherein the tube has a non circular cross sectional shape, such as, but not limited to, a rectangle, a triangle, or any other polygon, an oval, or any other curved shape. In one embodiment, the end member 102 expand near the end member opening 112 and may have a larger cross sectional diameter relative to the base of the tube to complement the diameter of the central tube member 110. In another embodiment, the end member 102 may not have a base 140 has seen in FIGS. 5 and 6, and may attach directly to the truck 200 at the end member base rim 148, such as with an adhesive or mechanical fastener. Similarly, the T-connector 310 may not have a base 340 has seen in FIG. 8, and may attach directly to the truck 200 at the end member base rim 348, such as with an adhesive or mechanical fastener.

The central tube member 110 may comprise a tube wall 111 having an inner surface and outer surface. The central tube member 110 may generally be in the shape of a tube with a tube end 173 and a recess formed by the tube wall 111. The tube wall may have a circular cross sectional shape, but in other embodiments may have any shape, such as, but not limited to, a rectangle, a triangle, or any other polygon, an oval, or any other curved shape. The central tube member 110 may be shaped to complement the cross sectional shape of the end member opening 112. The length of the tube may be substantially straight, but need not be, as curved or other arched central tube member 110 embodiments are contemplated herein.

The central tube member 110 may be attached to the end member 102 by any attachments means or construction. In one embodiment, the shape and size of the cross-section of the central tube member 110 complements the shape and size of the cross-section of the first end member opening 112 such that the central tube member 110 can slide into the first end member opening 112. In such a configuration, one or more spacers 180 may be employed between the inner surface 133 of the end member tube wall 103 and the outer surface 123 of the central tube member tube wall 111. Alternatively, the central tube member 110 and the end member 102 may be sized such that the inner surface 133 of the end member tube wall 103 and the outer edge 123 of the central tube member tube wall 111 are in direct contact and hold the central tube member 110 and end member 102 in a securely attached position.

Figure 7:
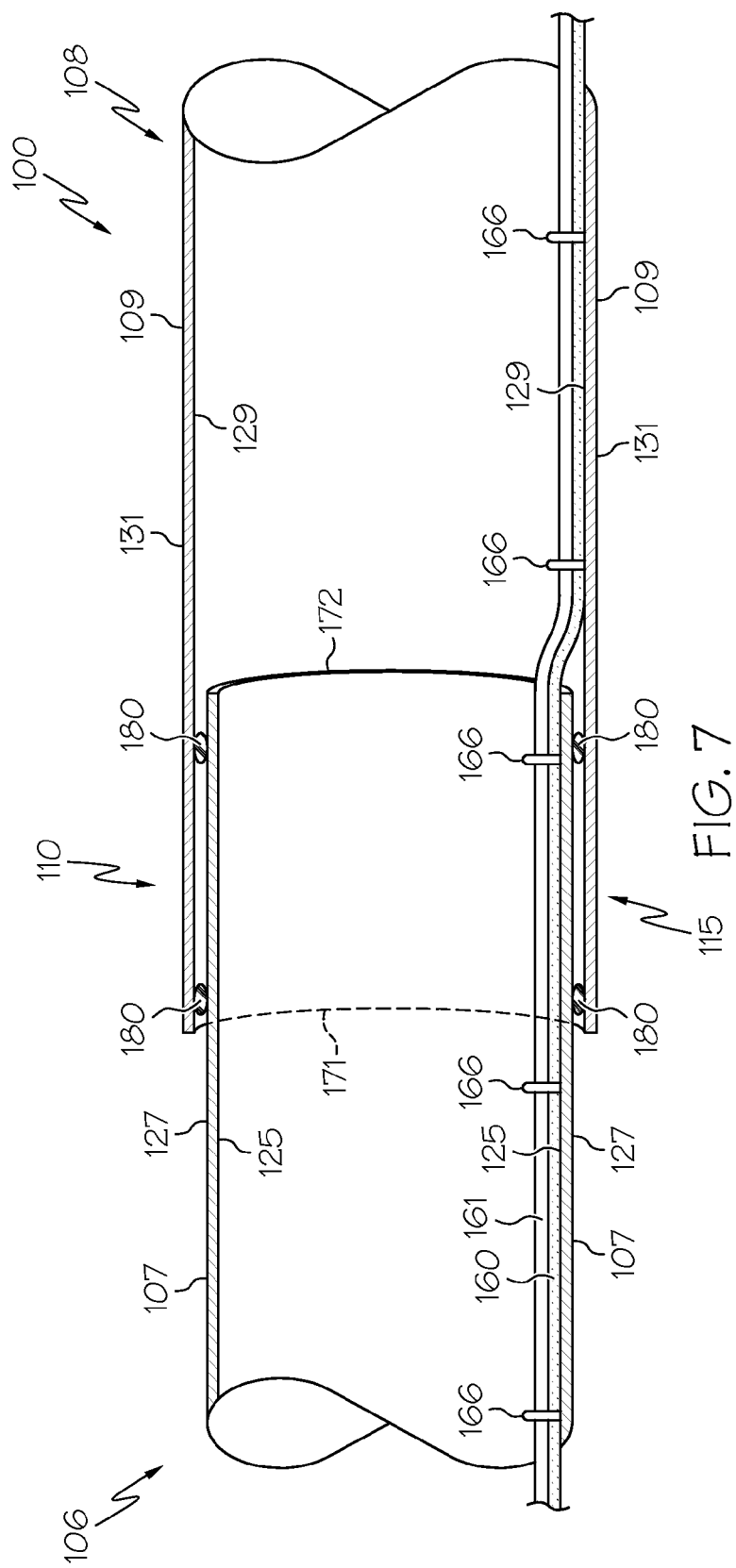
FIG. 7 is a schematic cut-away length view of the attachment point of the first central tube component and second central tube component of the two-part adjustable central tube member of FIG. 2, according to one or more embodiments of the present disclosure.

Now referring to FIG. 7, as discussed herein, in one embodiment of the lighted bed rail 100 the central tube member 110 comprises one or more central tube components 106,108. The first central tube component 106 and second central tube component 108 that make up the central tube member 110 may cooperate such as to be attached to one another at an attachment point 115 where the first central tube component 106 and second central tube component 108 overlap. The first central tube component 106 may comprise a first central tube component tube wall 107 comprising an inner surface 125 and an outer surface 127, and the second central tube component 108 may comprise a second central tube component tube wall 109 comprising an inner surface 129 and an outer surface 131.

In one embodiment, the shape and size of the first central tube component 106 complements the shape and size of the second central tube component 108 such that the first central tube component 106 can slide into the second central tube component 108. In such a configuration, one or more spacers 180 may be employed between the inner surface 129 of the second central tube component tube wall 109 and the outer surface 127 of the first central tube component tube wall 107. Alternatively, the first central tube component 106 and the second central tube component 108 may be sized such that the inner surface 129 of the second central tube component tube wall 109 and the outer surface 127 of the first central tube component tube wall 107 are in direct contact and hold the central tube member 110 and end member 102 in an attached position. The tube ends 171,172 may be adjusted relative to one another such that the length of the central tube member 110 is adjustable, enabling an installer to properly attain a central tube member 110 that can fit between the two end members 102,104 when installed on a vehicle 200.

Figure 8:
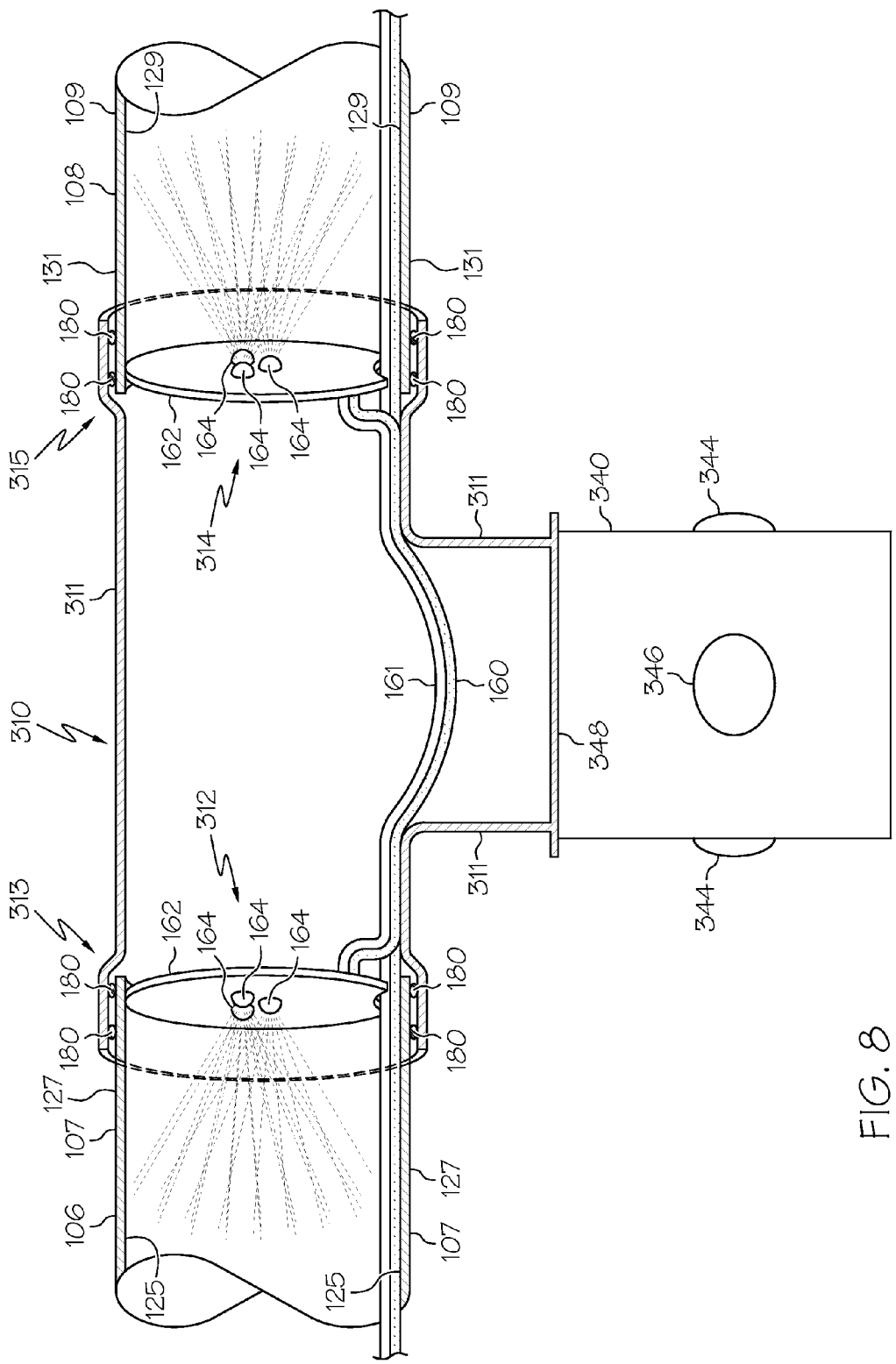
FIG. 8 is a schematic cut-away length view of the attachment points of the first central tube component, second central tube component, and T-connector of FIG. 4, according to one or more embodiments of the present disclosure.

Now referring to FIG. 8, as discussed herein, in one embodiment of the lighted bed rail 100 the central tube member 110 comprises one or more central tube components 106,108 attached to a T-connector 310. The first central tube component 106 and second central tube component 108 that make up the central tube member 110 may cooperate with a T-connector first opening 312 and T-connector second opening 314, respectively, to attach the first central tube component 106 and second central tube component 108 to the T-connector 310.

In one embodiment, the end member 102 generally comprises a T-connector first opening 312 that may accept the first central tube component 106, a T-connector second opening 314 that may accept the second central tube component 108, and a T-connector base 340. The T-connector first opening 312 and T-connector second opening 314 may be shaped such as to allow for the first central tube component 106 and second central tube component 108 of the central tube member 110 to be connected to the T-connector 310 wherein the T-connector 310 may attach to a vehicle 200 at the T-connector base 340 and have the central tube member 110 positioned relatively horizontally and parallel to the top of the truck bed side wall and the driving surface. In one embodiment, the T-connector 310 may generally be a curved tube shape, such as a T-shaped pipe or tube, comprising a T-connector wall 311 comprising a T-connector wall inner surface 318 and a T-connector wall outer surface 319.

The T-connector 310 may be constructed from a plastic material, such as, but not limited to, polyvinyl chloride, acrylic, polycarbonate, polyethylene, from a ceramic material, or from metallic or semi-metallic material, such as, but not limited to, iron and alloys thereof, such as steel, or combinations thereof. The T-connector 310 may be opaque or alternatively may be transparent or translucent, and may be constructed from a colored material, such as to project a colored light when a light ray passes through the T-connector wall 311.

In one embodiment, the T-connector wall 311 may comprise a T-connector base 340 that is inside the bed side wall and non-visible when the lighted bed rail 100 is installed onto a vehicle 200. The T-connector base 340 may comprise a T-connector base rim 348 which is situated directly on top of the bed side wall when the lighted bed rail 100 is installed. The T-connector base 340 may comprise at least one extendable arm member 344,346 that can extend outward from the T-connector base 340 to allow for the T-connector 310 to lock into the truck bed side wall. In one embodiment, the T-connector base 340 may comprise at least an inner extendable arm member 344, and side extendable arm member 346 that are positioned around the T-connector base 340 to adequately lock in the T-connector 310 to the truck bed side wall. The at least one extendable arm members 344,346 may be spring loaded, such that they can be compressed into the T-connector base 340 when the lighted bed rail 100 is being installed and automatically deploy outward once inserted into a recess or aperture of the truck bed side wall to lock the lighted bed rail 100 into place.

The T-connector 310 may have a circular cross sectional shape, but is not limited to such a cross sectional shape, as the end member may generally comprise a bended tube shape wherein the tube has a non circular cross sectional shape, such as, but not limited to, a rectangle, a triangle, or any other polygon, an oval, or any other curved shape. In one embodiment, the T-connector 310 expands near the T-connector first opening 312 and T-connector second opening 314 and may have a larger cross sectional diameter relative to the base of the tube to complement the diameter of the first central tube component 106 and second central tube component 108. In another embodiment, the central tube member 110 is a single tube structure and fits within the T-connector 310 and may pass through the T-connector first opening 312 and T-connector second opening 314.

It should be understood that a combination of one or more T-connectors 310 and one or more overlapping two-part tube components may be employed in the same lighted bed rail 100. For example, a lighted bed rail 100 may comprise multiple T-connectors 310 with one or more overlapping two-part tube components disposed between each T-connector 310.

The central tube member 110, including any tube components of the central tube member 110, may be constructed from a plastic material, such as, but not limited to, polyvinyl chloride, acrylic, polycarbonate, polyethylene, from a ceramic material, or from metallic or semi-metallic material, such as, but not limited to, iron and alloys thereof, such as steel, or combinations thereof. The central tube member 110 may be opaque or alternatively may be transparent or translucent, such as to be sufficiently transparent or translucent to allow for the transmission of light projected from the lighting apparatus through the tube wall. In one embodiment, the central tube member 110 may comprise a transparent or translucent material that is colored, and may project a colored glow and/or light when light is passed through the central tube member tube wall 111.

In one embodiment, the central tube member 110 may comprise areas that are opaque and areas that are transparent or translucent, such as to form patterns, shapes, letters, words, logos, pictures, advertisements and/or any other symbols. Furthermore, in some embodiments, the central tube member 110 may have varying combinations and patterns of opaque, translucent, and/or transparent areas, each of which may be of different or the same colors. For example, a word or phrase could be spelled out by a translucent material on an otherwise opaque central tube member 110. Alternatively, an opaque sticker or decal could be secured to a translucent tube, such that the pattern of the sticker of decal may spell out a word or phrase. Other techniques to make a transparent or translucent tube opaque are contemplated herein, such as with a paint. In one embodiment, the central tube member may display an advertisement and/or other logo of a product or company. For example, in one non-limiting embodiment, the lighted bed rail 100 may display a logo of a professional or collegiate sports team, or other such advertisement. In another non-limiting embodiment, the lighted bed rail 100 may display a logo of a business or other trade name associated with a product of a business.

It should be understood that any of the parts of the lighted bed rail 110 may be transparent or translucent or opaque, and any combination of such parts is contemplated herein. Generally, any part of the lighted bed rail may be lit and have a glowing appearance if desired.

Referring now to FIGS. 1-8, the lighted bed rail 100 comprises at least one lighting apparatus 162. The lighting apparatus 162 may be disposed on or within the first end member 102, second end member 104, T-connector 310, central tube member 110, including any component of the central tube member 110. The lighting apparatus may be capable of projecting light onto at least a portion of the inner surface 121 of the tube wall 111 of the central tube member 110, the inner surface 133 of the end member tube wall 103 of the first end member 102, second end member 104, or both, or the T-connector wall inner surface 318 of the T-connector wall 311 of the T-connector 310, or any combination thereof.

Generally, the lighting apparatus 162 may comprise one or more light sources 164, such as, but not limited to conventional light bulbs, LED bulbs, or any other light generating source. The light source 164 may be of any color, and may display patterns is so desired. Each lighting apparatus 162 may comprise one or more light sources 164, and the light sources 164 may be in any spatial and/or geometric positioning relative to one another. For example, as seen in FIGS. 5 and 8, a lighting apparatus 162 may comprise three light sources 164 arranged in a triangular pattern. However, any pattern is contemplated herein. In one embodiment, seen in FIGS. 5 and 6, the lighting apparatus 162 is mounted onto the inner surface 133 of the end member tube wall 103 and is positioned to shine light down the length of the central tube member 110. In another embodiment, seen in FIG. 8, the lighting apparatus 162 is a circular shaped such as to have a complementary shape to the cross sectional shape of the first central tube component 106 and second central tube component 108. However, such a circular lighting apparatus 162 may be positioned within any of the tube structures of the central tube member 100, including any part of the central tube member 110, T-connector 310, first end member 102, or second end member 104. Multiple lighting apparatuses 162 may be used in a single lighted bed rail 100.

The lighting apparatus 162 may have a data line 160 and power line 161 connected thereto. The data line 160 may carry a communicative signal to the lighting apparatus 162, such as, but not limited to, an on/off signal, a fade signal, or a color signal. The power line 161 may provide the lighting apparatus 162 with electrical power, such as to enable the light sources 164 to shine. The data line 160 and power line 161 may be held in place by a line clamp 166 that is disposed within any of the tube parts of the lighted bed rail 100. In one embodiment, the power and data are provided to the lighting apparatus 162 through a single line.

The power line 161 may be connected to any power source, such as a power source on the vehicle 200 or an external power source, such as a battery. Such power sources may be found on a vehicle, such as near the headlights, taillights, or tag lights, and may be connected to the electrical systems of the vehicle 200. The lighting apparatus 162 may be connected to one or more sources by the data line 160 to control the functionality of the lighted bed rail 100. For example, the lighting apparatus 162 may be connected to a vehicles headlights, taillights, tag lights to allow the lighted bed rail 100 to function as running lights, to a vehicle's brake light to allow the lighted bed rail 100 to function as a brake light, or to a vehicle's turn signals to allow the lighted bed rail 100 to function as a turn signal. Combinations of such functionality are also contemplated herein. All or some of the data supplied to the lighting apparatus 162 may delivered over a wireless signal or network to a wireless communication receiver/transmitter, that may communicate with the lighting apparatus 162 to deliver a data signal.

Generally, the lighting apparatus may comprise any device capable of producing a light. For example, a strand of lights, such as holiday lights used for decorating may be the lighting apparatus. In other embodiments, the lighting apparatus may be a projector, which can change lighting images. The lighting apparatus may have any lighting features, such, but not limited to, as automatic blinking or patterning, or periodic color change.

It should be understood that the attachment means between any combination of the central tube member 110, end members 102,104, or T-connector are not limited to the embodiments shown in FIGS. 1-8, and that any effective means of attachment is contemplated herein. It should further be understood that the lighted bed rail 100 may be a unitary structure that does not comprise individual parts, such as a central tube member 110, end members 102,104, or T-connector. It should further be understood that the connection means described herein, such as, but not limited to, overlapping adjoining tubing, can be in any arrangement, such as that the various tube components may provide the outer and inner sections in the overlapping areas.

It should also be understood that the lighted bed rails as disclosed herein may be installed or attached to any part of any automobile. Therefore, while the lighted bed rails 100 are disclosed herein in an embodiment wherein they are attached to the top of the bed side walls 212 of a vehicle 200, they may be attached to any type of automobile and may be attached any part of that automobile.

The present disclosure also relates to a pick-up truck that may generally comprise a bed, two bed side walls, and the lighted bed rails described herein attached to the top of each of the bed side walls.

In one embodiment, the lighted bed rail 100 is installed onto a vehicle 200 by inserting the end member bases 140 and the T-connector base 340 (if present on the lighted bed rail 100) into receiving truck bed rail apertures in the vehicle 200. In another embodiment, the lighted bed rail 100 need not have end member bases 140 and the T-connector base 340, and the parts of the lighted bed rail 100 that contact the vehicle 200 can be mechanically attached to the truck bed side wall with screws, fasteners, adhesive, or any other means of permanent or semi-permanent attachment. For example, in one embodiment, the lighted bed rail 100 may not have base components 340,140 that are not visible upon installation of the lighted bed rail 100. It should also be understood that the installation of the lighted bed rail 100 disclosed herein may vary depending of the exact specifications and design of the lighted bed rail 100.

In one embodiment, sections of the lighted bed rail 100 may be pre-attached for a user to make installation onto a vehicle easier and less time consuming. For example, each end member may be pre-attached to sections of the central tube member. Other combinations of pre-attachment are also contemplated herein.

Furthermore, it should be understood that while the device disclosed herein is a truck bed rail, the principles of the present design can be applied to any car accessory to allow it to glow. For example, a translucent spoiler or other body panel could be designed to be lit using the teachings of this disclosure.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A lighted bed rail for use with a vehicle, the lighted bed rail comprising:
    a central tube member comprising a first end, a second end, and a tube wall, the tube wall comprising an inner surface and an outer surface;
    a first end member attached to the central tube member at or near the first end of the central tube member and comprising means for affixing the first end member to the vehicle;
    a second end member attached to the central tube member at or near the second end of the central tube member and comprising means for affixing the first end member to the vehicle; and
    at least one lighting apparatus disposed on or within the first end member, second end member, or central tube member, the lighting apparatus capable of projecting light onto at least a portion of the inner surface of the tube wall of the central tube member; and
    wherein the tube wall of the central tube member is sufficiently transparent or translucent to allow for the transmission of light projected from the lighting apparatus through at least a portion of the tube wall of the central tube member.

2. The lighted bed rail of claim 1, wherein the central tube member comprises a first central tube component and a second central tube component.

3. The lighted bed rail of claim 2, wherein the first central tube component and the second central tube component are attached to one another such that a length of the central tube member is adjustable.

4. The lighted bed rail of claim 2, wherein the first central tube member and second central tube member are attached to a T-connector, the T-connector capable of being attached to the vehicle.

5. The lighted bed rail of claim 4, wherein a lighting apparatus is disposed on or within the T-connector.

6. The lighted bed rail of claim 1, wherein at least a portion of the central tube member is translucent.

7. The lighted bed rail of claim 1, wherein at least a portion of the central tube member is translucent and colored, or at least a portion of the central tube member is transparent and colored.

8. The lighted bed rail of claim 1, wherein the central tube member is capable of displaying a pattern, shape, letter, word, logo, picture, advertisement and/or other symbol on the tube wall of the central tube member.

9. The lighted bed rail of claim 1, wherein at least a portion of the central tube member is translucent and a portion of the central tube member is opaque.

10. The lighted bed rail of claim 1, wherein a first lighting apparatus is disposed on or within the first end member and a second lighting apparatus is disposed on or within the second end member.

11. The lighted bed rail of claim 1, wherein the first end member and second end member each comprise a base, the base comprising one or more extendable arm members.

12. The lighted bed rail of claim 1, wherein the central tube member comprises a translucent or transparent plastic material shaped as a tube with a circular cross section.

13. The lighted bed rail of claim 1, wherein the first end member and second end member comprise plastic piping.

14. The lighted bed rail of claim 1, wherein at least a portion of the first end member or the second end member, or both, is translucent.

15. A lighted bed rail for use with a vehicle, the lighted bed rail comprising:
    a central tube member comprising a first end, a second end, and a tube wall, the tube wall comprising an inner surface and an outer surface;
    a first end member attached to the central tube member at or near the first end of the central tube member and comprising means for affixing the first end member to the vehicle;
    a second end member attached to the central tube member at or near the second end of the central tube member and comprising means for affixing the first end member to the vehicle; and
    at least one lighting apparatus disposed on or within the first end member, second end member, or central tube member, the lighting apparatus capable of projecting light onto at least a portion of the inner surface of the tube wall of the central tube member; and
    wherein:
        the tube wall of the central tube member is sufficiently transparent or translucent to allow for the transmission of light projected from the at least one lighting apparatus through at least a portion of the tube wall of the central tube member;
        at least a portion of the central tube member is translucent; and
        at least a portion of the first end member and at least a portion of the second end member is opaque.

16. The lighted bed rail of claim 1, wherein the central tube member comprises a first central tube component and a second central tube component, and wherein the first central tube component and the second central tube component are attached to one another such that a length of the central tube member is adjustable.

17. The lighted bed rail of claim 15, wherein the first central tube member and second central tube member are attached to a T-connector, the T-connector capable of being attached to the vehicle.

18. The lighted bed rail of claim 15, wherein a first lighting apparatus is disposed on or within the first end member and a second lighting apparatus is disposed on or within the second end member.

19. A vehicle comprising a bed, two bed side walls, and a lighted bed rail attached to the top of each of the bed side walls, the lighted bed rail comprising:
    a central tube member comprising a first end, a second end, and a tube wall, the tube wall comprising an inner surface and an outer surface;
    a first end member attached to the central tube member at or near the first end of the central tube member and comprising means for affixing the first end member to the vehicle;
    a second end member attached to the central tube member at or near the second end of the central tube member and comprising means for affixing the first end member to the vehicle; and at least one lighting apparatus disposed on or within the first end member, second end member, or central tube member, the lighting apparatus capable of projecting light onto at least a portion of the inner surface of the tube wall of the central tube member; and wherein the tube wall of the central tube member is sufficiently transparent or translucent to allow for the transmission of light projected from the lighting apparatus through at least a portion of the tube wall of the central tube member.

20. The lighted bed rail of claim 19, wherein the central tube member comprises a first central tube component and a second central tube component.

21. The lighted bed rail of claim 20, wherein the first central tube component and the second central tube component are attached to one another such that a length of the central tube member is adjustable.

\* \* \* \* \*